United States Patent [19]
Millies et al.

[11] 3,757,998
[45] Sept. 11, 1973

[54] ADAPTOR SYSTEM FOR A VENDING MACHINE TO ADAPT IT TO THE VENDING OF VARIOUS SIZE ARTICLES

[76] Inventors: Clarence Frederick Millies; Loren V. Hughes, both of 727 Dixmyth, 605 Tower West, Cincinnati, Ohio 45220

[22] Filed: Dec. 8, 1971

[21] Appl. No.: 205,890

[52] U.S. Cl. .............................. 221/242, 221/250
[51] Int. Cl. ............................................ G07f 11/16
[58] Field of Search .................... 221/241, 242, 247, 221/250

[56] References Cited
UNITED STATES PATENTS

| | | | |
|---|---|---|---|
| 2,693,299 | 11/1954 | Gross | 194/10 X |
| 3,168,965 | 2/1965 | Rinn | 221/242 X |
| 3,145,066 | 8/1964 | O'Neal | 221/242 X |
| 2,272,682 | 2/1942 | Srodulski | 221/242 X |
| 1,887,197 | 11/1932 | Giles | 221/241 |
| 1,677,938 | 7/1928 | Van Sickle | 221/241 |

Primary Examiner—Robert B. Reeves
Assistant Examiner—Thomas E. Kocovsky
Attorney—William V. Miller et al.

[57] ABSTRACT

An adaptor system for use on vending machines, such as a cigarette vending machine, of the type in which the articles to be vended are supported as a column of superimposed articles with the lowermost article resting on a support at a predetermined level or ejector plane where it is subjected to an ejector that will move the article off that plane in an ejecting or dispensing stroke. The adapter system includes means for adjusting the support or ejector plane to different levels so as to adapt the machine to the dispensing of articles of different thicknesses. It also includes means for changing the width and length of the magazine to adapt the machine to the dispensing of articles of different lengths and widths. It further includes means for making compensating adjustments of the ejector to adapt it to the different thicknesses, width, and lengths of the articles to be dispensed.

39 Claims, 27 Drawing Figures

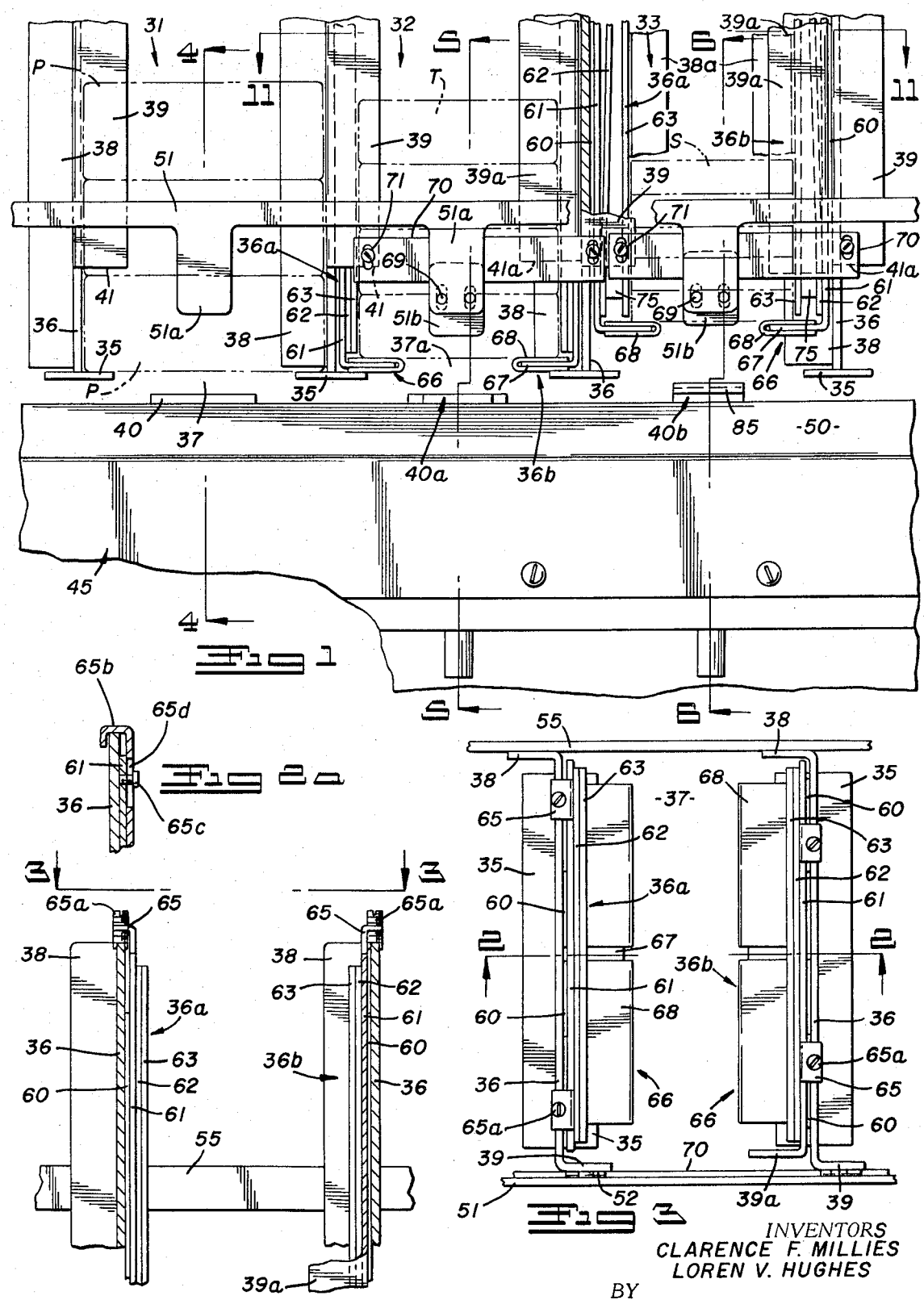

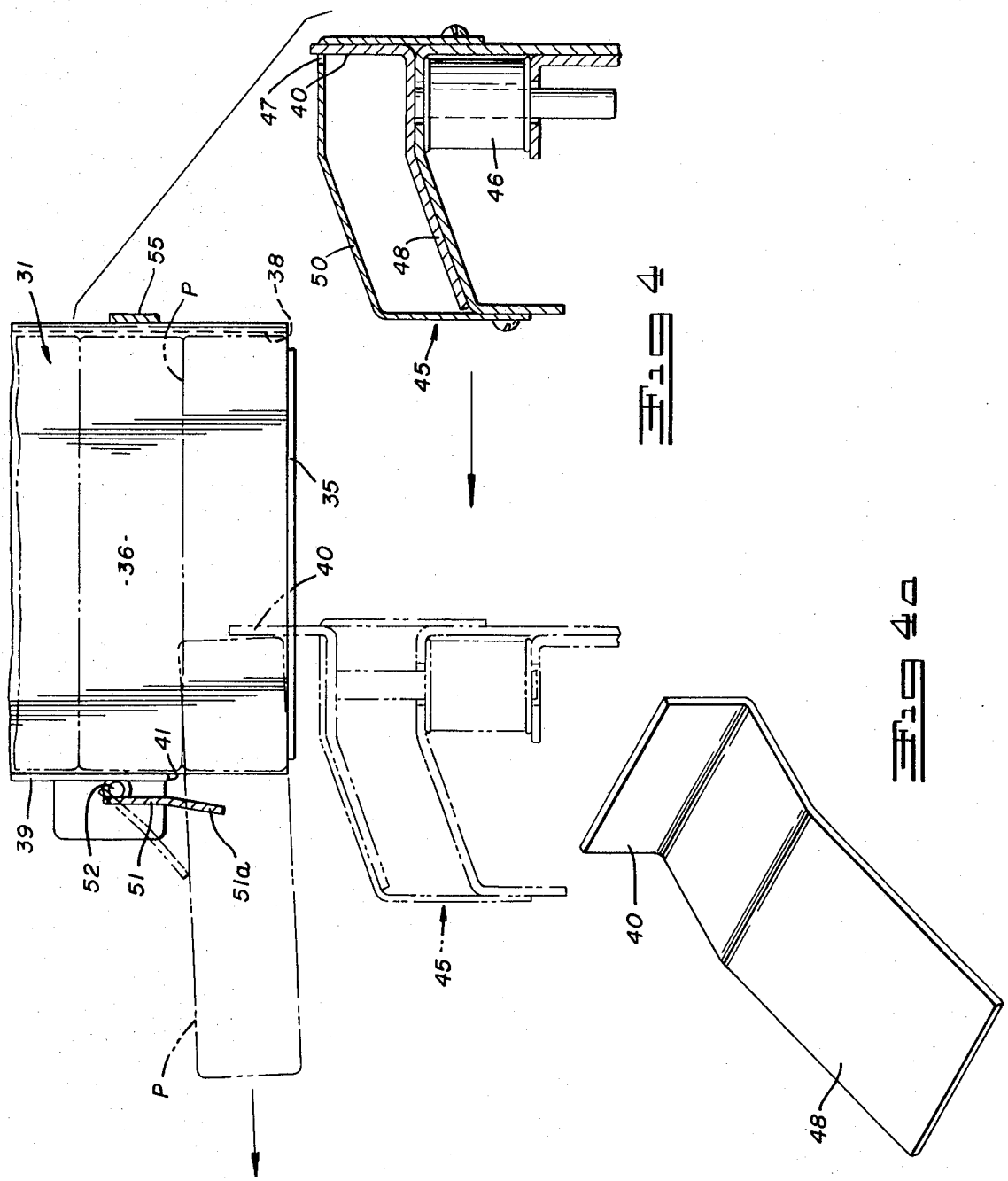

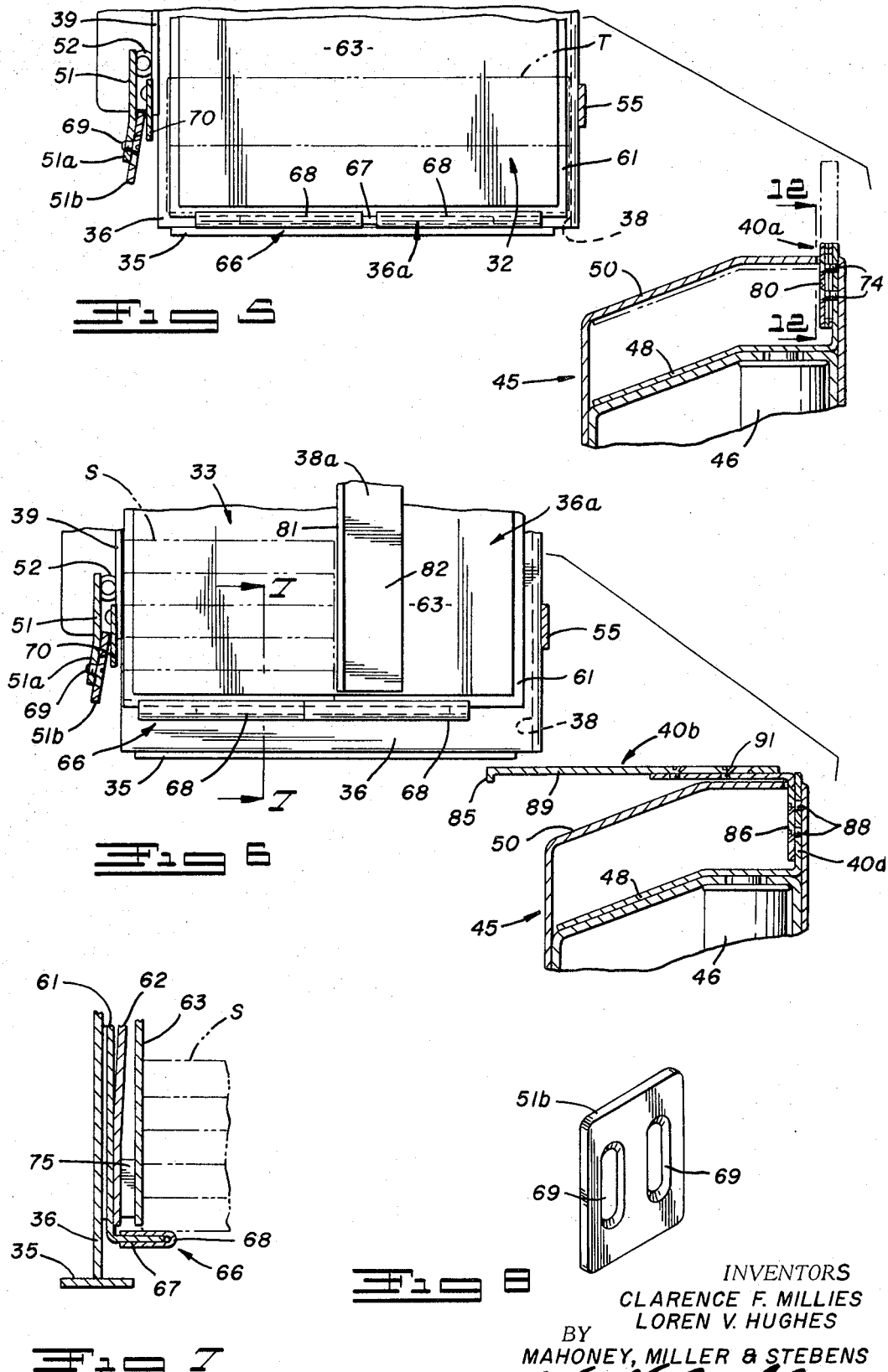

Patented Sept. 11, 1973
3,757,998
7 Sheets-Sheet 4
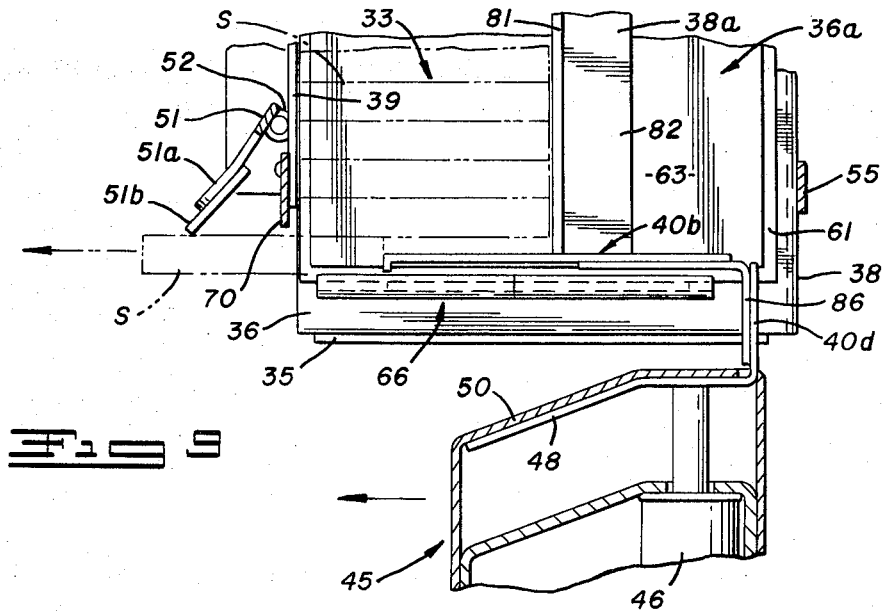
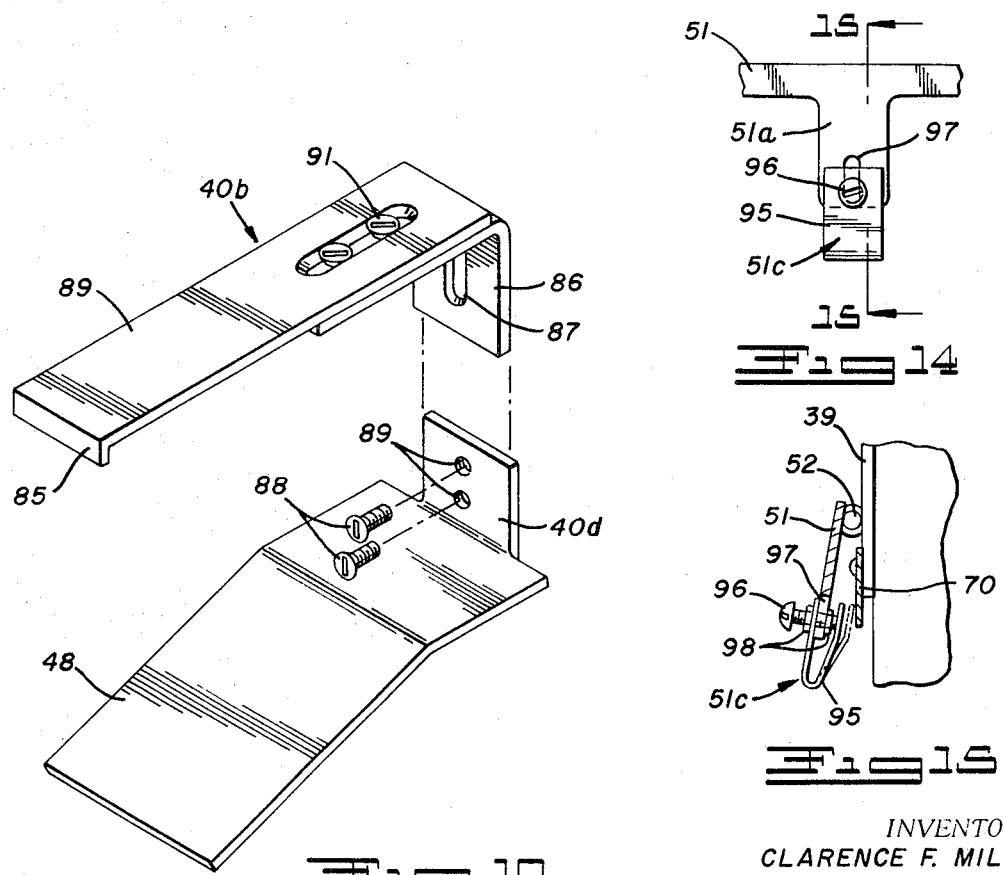
INVENTORS
CLARENCE F. MILLIES
LOREN V. HUGHES
BY MAHONEY, MILLER & STEBENS
Wm. V. Miller
ATTORNEYS

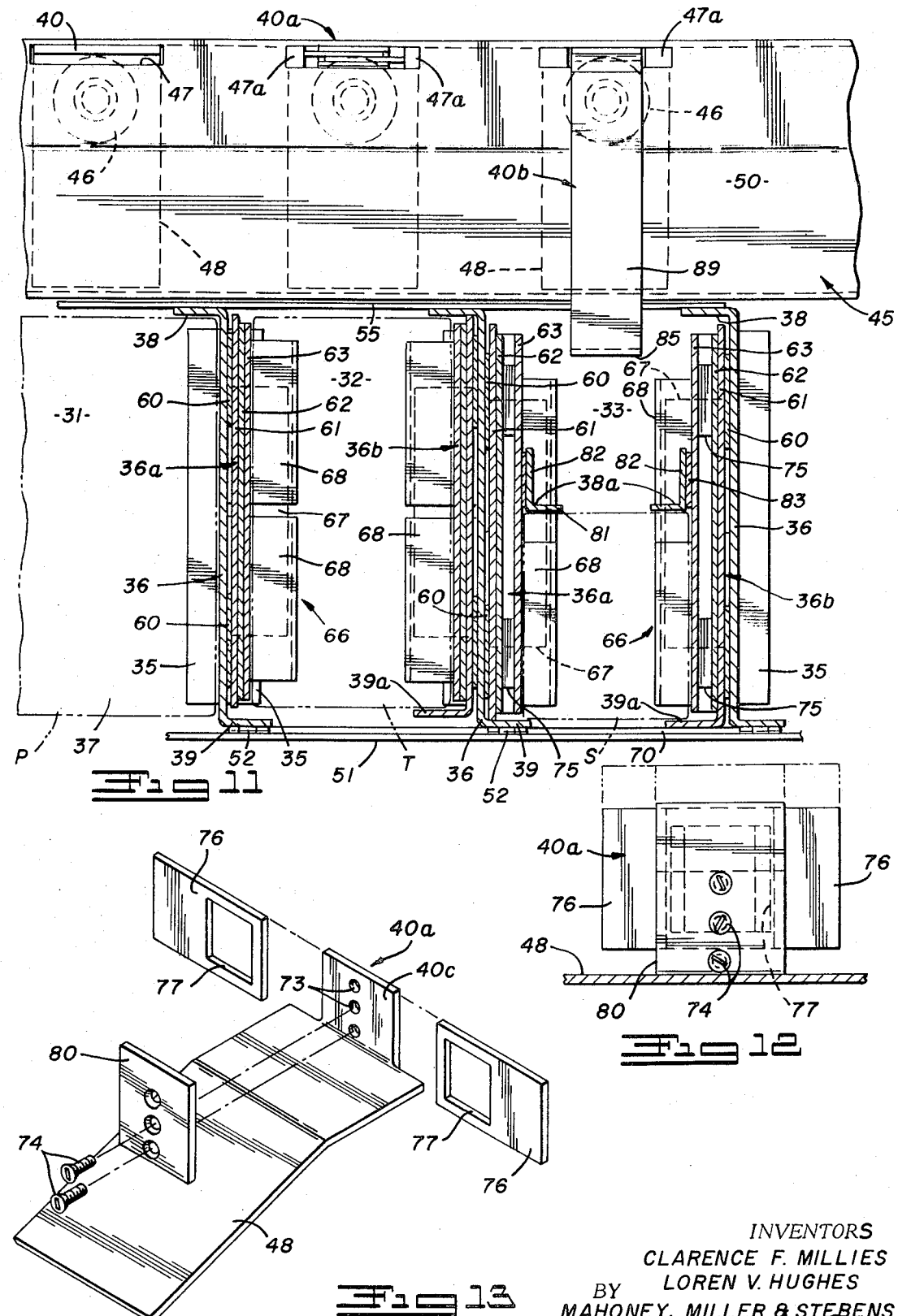

Patented Sept. 11, 1973
3,757,998
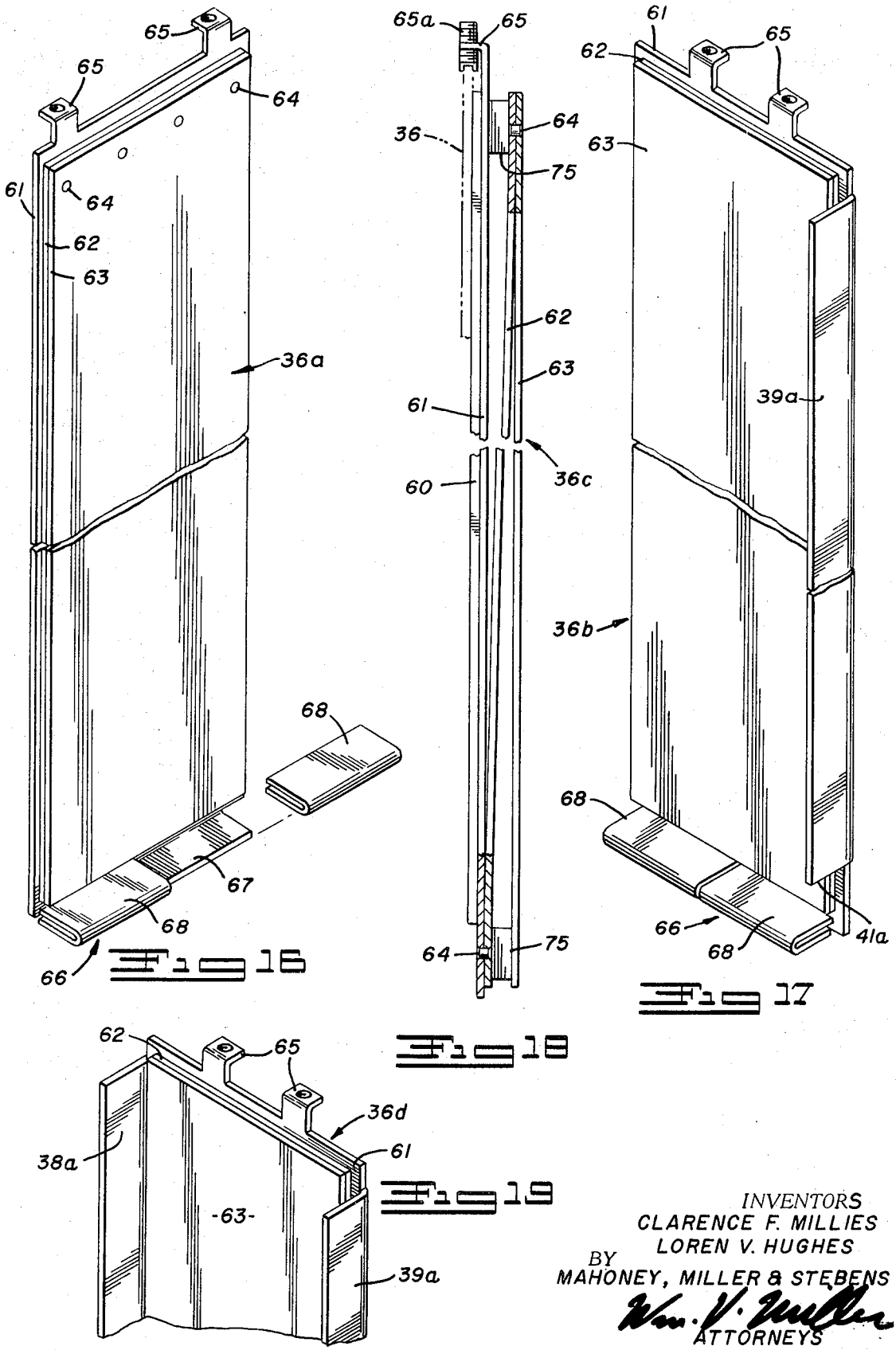
INVENTORS
CLARENCE F. MILLIES
LOREN V. HUGHES
BY
MAHONEY, MILLER & STEBENS
ATTORNEYS

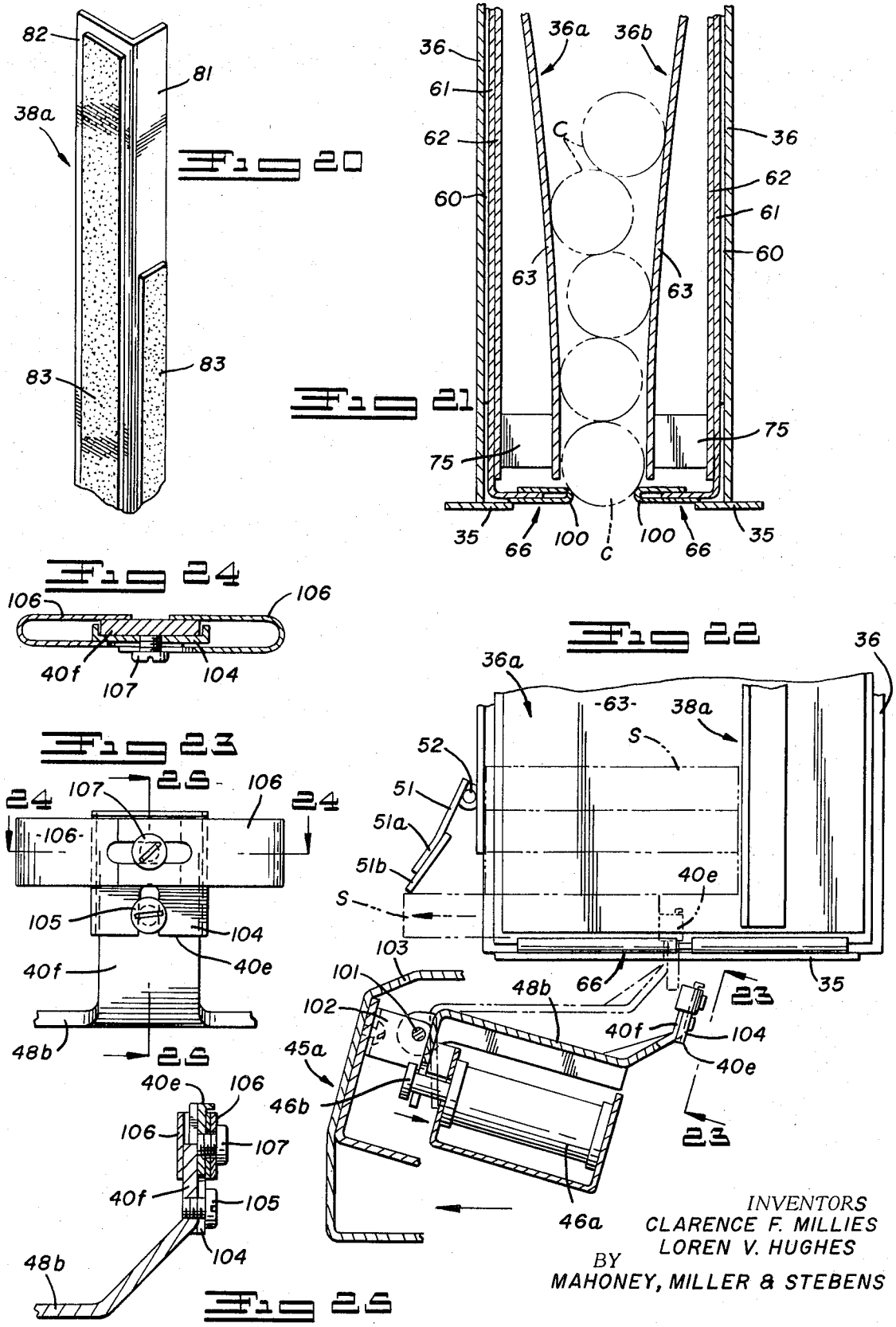

ADAPTOR SYSTEM FOR A VENDING MACHINE TO ADAPT IT TO THE VENDING OF VARIOUS SIZE ARTICLES

A type of cigarette vending machine now in use includes a magazine which supports a vertical column of packages superimposed in flat relationship. The lowermost article is supported at an ejector plane, usually provided by horizontal support flanges or shelves which extend forwardly and rearwardly and are spaced apart to provide an ejector passage or slot therebetween. An ejector is disposed in cooperative relationship with the lower end of the magazine and in its ejecting stroke will move into engagement with the adjacent end of the article to slide it off the shelves to a vending position. In the ejecting stroke, an article contact finger on the ejector will move through the slot between the support flanges or shelves.

It would be desirable to adapt these cigarette vending machine and other similar machines to the vending of other articles which may be of different dimensions, either in thickness, width or length or all three. The present invention provides a simple adaptor system having parts which can be attached readily to this type of machine so that it can vend the articles or packages of the different sizes.

This system includes generally, means associated with the magazine for varing the plane of support and ejection of the lowermost article resting in the magazine in accordance with variations in thickness of articles to be vended, means associated with the magazine for changing its width in accordance with variations in the width of articles to be vended, means associated with the magazine for changing its forward to rearward extent in accordance with variations in the length of articles to be vended, and means for making any necessary variations in the article-engaging finger of the ejector to compensate for variations in the sizes of the articles being ejected.

The best mode contemplated in carrying out this invention is illustrated in the accompanying drawings in which:

FIG. 1 is a schematic view, partly in elevation, and partly in section, showing a portion of a cigarette vending machine to which this invention may be applied.

FIG. 2 is a partial vertical sectional view taken substantially along line 2—2 of FIG. 3 showing a variable size adaptor attachment applied to the magazine of the machine according to this invention.

FIG. 2a is a detail in vertical section showing a different type of adjustment for the attachment of FIG. 2.

FIG. 3 is a plan view taken along line 3—3 of FIG. 2.

FIG. 4 is a vertical sectional view taken along line 4—4 of FIG. 1.

FIG. 4a is a perspective view of the ejector finger of FIG. 4.

FIG. 5 is a vertical sectional view taken along line 5—5 of FIG. 1.

FIG. 6 is a vertical sectional view taken along line 6—6 of FIG. 1.

FIG. 7 is a vertical sectional view taken along line 7—7 of FIG. 6.

FIG. 8 is a perspective view of an article-contact lug which is adjustably mounted on the damper bar of the structures shown in FIGS. 5 and 6.

FIG. 9 is a vertical sectional view similar to FIG. 5 but showing a different type of ejector finger.

FIG. 10 is a detail in perspective of the ejector finger shown in FIG. 9.

FIG. 11 is a horizontal sectional view taken along line 11—11 of FIG. 1.

FIG. 12 is a vertical sectional view taken along line 12—12 of FIG. 5.

FIG. 13 is a detail in perspective of the ejector finger shown in FIG. 12.

FIG. 14 is a detail of another form of article-contact lug attached to the damper bar of the machine.

FIG. 15 is a vertical sectional view taken along line 15—15 of FIG. 14.

FIG. 16 is a perspective view of one type of adjustable side wall attachment provided for the magazine.

FIG. 17 is a perspective view of another type of adjustable side wall attachment for the magazine.

FIG. 18 is a vertical sectional view through another type of adjustable side wall attachment for the magazine.

FIG. 19 is a perspective view showing still another type of adjustable side wall attachment for the magazine.

FIG. 20 is a perspective view of a flange to be attached to the side wall of the magazine, as shown in FIG. 11, to change the magazine for different length articles.

FIG. 21 is a vertical transverse sectional view through the magazine having the adjustable side walls in an adjusted position which makes it possible to vend cylindrical articles.

FIG. 22 is a vertical sectional view showing a different type of ejector on the vending machine.

FIG. 23 is a detail in elevation of the ejector finger taken from the position indicated at line 23—23 of FIG. 22.

FIG. 24 is a horizontal sectional view taken along line 24—24 of FIG. 23.

FIG. 25 is a vertical sectional view taken along line 25—25 of FIG. 23.

With specific reference to the drawings, in FIG. 1, there is illustrated generally and schematically a cigarette package vending machine of a type to which this invention is applicable. However, it is to be understood that the invention is not necessarily limited to this specific type of machine. Only portions of this commonly known machine necessary to the understanding of this invention are illustrated. The machine includes a series of magazines disposed side-by-side and which are adapted to receive columns of articles, such as cigarette packs, for dispensing. In the example shown, three magazines 31, 32 and 33, are illustrated. As originally designed and constructed, the machine will dispense cigarette packages from the respective magazines. These packages are indicated schematically at P in the magazine 31. However, in some cases, it would be desirable to adapt the machine so that articles or packages of different size could be dispensed from any selected or all of the magazines. In the present example, the adaptor system of this invention is shown associated with the magazines 32 and 33, respectively, for dispensing the articles or packages T and S therefrom, respectively.

As indicated in FIG. 1, in each of the magazines 31, 32, and 33 the articles are disposed in a pile or column composed of superimposed flat articles or packages, The magazine is usually of the type shown at 31 in which the lowermost package P rests on inwardly directed opposed stop flanges 35 at the lower extremities with opposed vertical sidewalls 36 which are disposed upright in parallel relationship. The flanges 35 thus serve as support shelves upon which the lowermost article or package in the magazine rests until it is pushed off of such shelves by the ejector. The upper surfaces of the flanges 35 may be termed the ejector plane of the machine before being modified according to this invention. The space or slot 37 between the inner edges of the opposed flanges 35 permits passage of the ejector finger 40 (FIG. 4) therebetween in its ejecting stroke whereby it engages the adjacent edge of the package P and pushes it off the flanges 35. The magazines are open at their rear sides although one or both of the walls 36 may carry an inwardly directed vertical flange 38 (FIGS. 1 and 3) to prevent rearward displacement of articles therefrom. Similarly, one or more of the walls 36 may carry at its forward edge a vertical flange 39 that extends inwardly to prevent forward displacement of the column of articles. However, these flanges terminate above the level of the horizontal support flanges or shelves 35 to permit forward feeding or advancing of the lowermost article by the ejector, as indicated at 41.

In the usual machine, an ejector is provided for each magazine or stack of articles. The ejector for each magazine usually comprises a vertically movable article contact finger 40. These fingers 40 are carried by a carriage 45 at longitudinally spaced intervals therealong. This carriage is reciprocated by the usual means in a vending stroke beneath the magazines, as indicated diagramatically in FIG. 4. Before this stroke is started, a finger 40 is selected to engage the lowermost article of the particular magazine from which the lowermost article or package is dispensed. In the machine shown, this selection is made by means of a solenoid 46 disposed within the carriage for lifting the finger 40 through a slot 47 in the top of the housing of the carriage. The finger 40, as indicated, is on the end of an arm 48 which is mounted for vertical bodily movement within the housing under the influence of the solenoid 46. It will be noted best in FIGS. 4 and 4a that the arm 48 and the finger 40, which it carries, form a substantially L-shaped member which has an inclined inner end and that the upper wall 50 of the carriage housing is complementally shaped so that when the member is lifted into contact therewith, by the solenoid 46, it will snugly fit against the lower surface thereof, as indicated by broken lines in FIG. 4.

Thus in this usual machine, a selected finger 40 is raised and is advanced by forward movement of the carriage 45 in its vending stroke. Assuming the finger 40 is aligned with the magazine 31, this raised finger will engage the end of the lowermost package P, which is supported by the flanges 35, and will slide it forwardly until it drops off the forward ends of the flanges 35 to a position where it is discharged to the purchaser. During the advancing ejecting movement of the ejector finger 40, it moves through the slot or passage 37 between the flanges 35. Forward movement of the package P, causes its forward end to engage an associated damper bar 51, which is shown best in FIGS. 1 and 4. This damper bar 51 is hinged for outward and upward swinging movement, by means of hinges 52, to the vertically disposed flanges 39 at the front side of the magazines. It will be noted from FIG. 4 that the hinge axis is located above the lower extremities 41 of the flanges 39 and that the damper bar has depending article-contact lugs 51a which extend below the extremities 41. It will be noted further from FIG. 1, that the lugs 51a are spaced along the bar in alignment with the respective magazines 31, 32 and 33. In some machines, the bar is continuous instead of having the lugs as shown. When this bar 51 is swung forwardly and upwardly by contact of an article with a lug 51a thereof, this starts certain timed operations in the vending machine, as is well known in the art. A brace bar 55 (FIGS. 2 to 6, 9 and 11) may extend across the machine at the rear sides of the magazines and may be rigidly secured to the rear flanges 38 at a suitable vertical position.

As previously indicated, this invention provides means for adapting the machine to the vending of articles of different sizes from the article or package P for which the machine was originally designed. For example, it may be adapted to the vending of thinner and narrower articles T, indicated in the magazine 32, and articles S, indicated in the magazine 33, which are of less thickness, less width and less length. This is accomplished by the use of adjustable side wall attachment units 36a and 36b (FIGS. 1, 2, 3 and 11) shown mounted in association with each of the sidewalls 36 of the respective magazines 32 and 33; by the use of rear end stop angle flanges 38a (FIGS. 1, 6 and 11) mounted on either or both of the sidewall units 36a and 36b; by the use of an adjustable ejector finger unit 40a or 40b (FIGS. 1, 5, 6 and 11) carried by the respective ejector associated with each of the magazines 32 and 33; and by the use of adjustable contact lugs 51b (FIGS. 1, 5, 6 and 9) mounted on each of the lugs 51a associated with the magazines 32 and 33 on the damper bar 51.

The magazine attachment side wall unit 36a is illustrated in detail in FIGS. 2, 3 and 16. It consists of several laminates which are preferably thin plates of metal although they could be panels of plastic or other suitable material. The plates are almost of the same area as the magazine side walls 36 and are fastened together at alternating upper and lower ends, for example, by rivets 64, welding, or in any other suitable manner. The plates thus are secured together so that they will have an accordion-like fold, making it possible to fold them into flat contact as shown in FIGS. 1, 2, 3, 11 and 16 or into expanded relationship as also shown in FIGS. 1, 7, 11 and 18. In the example shown, three plates 61, 62 and 63 are shown hinged together at alternating opposed ends but any suitable number can be used. As indicated best in FIG. 18 in connection with the unit 36a, which will be referred to in detail later, the outermost plate 61 is adapted to be disposed adjacent the side wall 36 of the magazine and on its outer surface may carry one or more attaching tapes 60, (FIGS. 1, 2, 3, 11, 18 and 22) extending substantially the full length or height thereof. These tapes may be of the magnetic type, or of pressure-type adhesive with adhesive on both faces. Thus, when plate 61 is pressed laterally into contact with the side wall 36, it will adhere thereto.

To suspend the unit 36a from the side wall 36, the arrangement shown in FIGS. 2 and 18 or 2a may be used. In FIG. 2, it is shown as comprising a pair of outwardly extending lugs 65 secured to the top edge of the plate 61 and having threaded adjustably therethrough the depending screws 65a which are adapted to engage the upper edge of the wall 36. Thus, by adjusting the screws 65a, the level of the unit 36a relative to the wall 36 can be preset, and when the unit is suspended from wall 36, it can be pressed outwardly to cause the outer surface of the wall 61 to adhere to the inner surface of the wall 36, due to the intervening tape strips 60. In FIG. 2a, the suspending means for the unit 36a is indiciated as comprising lugs 65b, similar to the lugs 65 but hooking on the upper edge of the wall 36. These lugs are adjustably connected to the wall 61 by clamping screws 65c tapped outwardly into the wall 61 at its upper end and passing through vertical slots 65d in the inner vertical portions of the lugs 65b. Thus, with this arrangement, the wall unit 36a will be suspended from the wall 36 at a pre-selected vertical position relative thereto. The wall unit 36b may be identical with the unit 36a except that it may be provided with a vertically disposed front flange 39a (FIGS. 1, 2, 3, 11, 17 and 19) which extends most of the length thereof but terminates at a lower point 41a to permit passage of the lowermost article in the magazine in which it is mounted but to prevent forward movement of other articles therein. The flange 39a is formed integral with the outer plate 61 at its forward edge.

For supporting the lowermost article in each of the magazines 32 and 33, each of the wall units 36a and 36b is provided with an inwardly directed article-supporting stop flange or shelf arrangement 66 as shown best in FIGS. 1, 3, 5, 6, 9, 11, 16 and 17. This arrangement includes an inwardly extending horizontal support flange 67 integrally formed on the lower edge thereof intermediate its forward and rearward edges. Clamps 68 of U-shape cross-section are mounted on the forward and rearward portions of the fixed flange 67 in alignment. These clamps may be adjusted laterally in and out on the flange 67 or forwardly and rearwardly on that flange. Thus, the space 37a between the inner edges of the opposing flanges 66 is adjustable and the lengths of the flanges forwardly and rearwardly is adjustable. The clamps 68 will grip flange 67 with sufficient pressure to stay in adjusted position.

If the article to be vended is thinner than the article P for which the machine is designed, the wall units 36a and 36b will be adjusted vertically to change the plane of ejection which is determined by the level of the stop flanges 66. Thus, for the vending of the articles T, in the magazine 32, the flanges 66 will rest on the flanges 35 (FIG. 1), the difference in thickness between the articles P and T being taken up by the thickness of the flange units 66. On the other hand, the thickness of the article S to be vended from the magazine 33 is much less than the articles T, and the flanges 66, therefore, must be raised considerably to compensate for this. This is accomplished by vertically adjusting the screws 65a or the lugs 65b. It will be noted that wall unit 36c in FIG. 18 is without the support flanges 66 and will be used when the ejector plane need not be changed.

In ejecting thinner articles from the magazines 32 and 33, it is not only necessary to provide a different ejector plane by flanges 66 but it is necessary to provide an adjustment on the pusher bar activating lugs 51a to ensure that the thinner articles will actuate the pusher bar as they are ejected. Each of the lugs 51a, aligned with the respective magazines 32 and 33, has a lug 51b (FIGS. 1, 5, 6, 8, 9 and 22) secured thereto by screw and slot connections 69 so that the lug 51b can be adjusted to depend to the proper extent to be engaged by the front end of the thinner article being vended. Also, to prevent forward displacement of the thinner article next above the lowermost article in the magazine, it is desirable to provide at the forward side and lower end of each magazine, an article stop plate 70 (FIGS. 1, 3, 5, 6, 9, 11 and 15). These plates 70 are secured crosswise of the respective magazines 32 and 33 and are secured to the front surfaces of the flanges 39 by the screw and slot connections 71 (FIG. 1) for vertical adjustment. Thus, they can be adjusted vertically to change the vertical extent of the forward article discharge slot at the lower end of the magazine located below the lower extremities 41 and 41a of the flanges 39 and 39a. This adjustment will be to a proper level to permit discharge of the lowermost article resting on the flanges 66, but not the next one thereabove, as the forward ejecting stroke occurs.

The wall units 36a and 36b will take up a small amount of the width of the magazines in which they are disposed and in their non-expanded condition (FIGS. 1 and 16) will make the magazines suitable for receiving articles of less width, such as the articles T in the magazines 32 in FIG. 1. However, the wall units 36a and 36b can be expanded to take up more of the width in the magazines so as to make them suitable for holding articles of lesser width, such as the articles S in the magazine 33, as shown in FIG. 1. To expand the walls, spacer bars or shims 75 may be positioned between the respective walls 61, 62 and 63 to extend almost the full transverse extent of those walls. The shims 75 may be either magnetic or may have pressure tape on each side, so that they will tend to stay in the predetermined locations in which they are initially placed to expand the wall units. They are shown in FIG. 1 but FIG. 18 is a better illustration of them positioned in the wall unit 36c which is identical except that it does not have the lower support flange 66. By positioning these shims 75, as shown best in FIG. 18, between the respective walls opposite their connected ends, the innermost wall 63 can be arranged parallel to the outermost wall 61. Thus, the wall unit can be expanded greatly into substantial thickness with its inner wall 63 vertical, as indicated in FIG. 18. However, in other cases, it may be desirable to have the inner wall 63 at an angle relative to the vertical, as in FIG. 21, which will be referred to more in detail later. Various thickness shims 75 may be used to obtain various expanded wall thicknesses.

In addition to the adjustments described above for receiving in and vending from the magazines articles of different sizes, it is usually desirable to make some changes or adjustments in the ejector finger 40, when ejecting articles of different sizes than those for which the machine was designed. The finger 40 in the usual machine is of a preselected width so that it will pass up between the support flanges 35 through the slot 37, during the ejecting stroke. However, with the addition of the wall units 36a and 36b to the magazine, the flanges 66 carried thereby result in the narrowing of the slot to form 37a (FIG. 1). To permit the ejector finger to pass through the slot 37a, the ejector finger can be cut off at each side, or preferably an adjustable finger structure 40a can be provided so that its width can be varied in accordance with the adjustment of the flanges 66 which vary the width of the slot 37a. This adjustable finger 40a is shown in FIGS. 1, 5, 11, 12 and 13.

With reference to FIG. 13, the arm 48 is shown with the upstanding finger lug 40c integral therewith and of less width than the original finger 40. It is provided with a plurality of tapped openings 73 for receiving clamping screws 74 after they are passed through a clamping plate 80. This clamping arrangement is adapted to clamp to the upstanding finger 40c, the overlapping plates 76 which are provided in a pair. Each of the plates 76 is provided with a large square opening 77 at its inner end. When the plates overlap, the screws 74 can pass through these communicating openings and relative lateral adjustment is possible to vary the overall width of the finger unit 40a. Tightening of the screws 74 will clamp the plates 76 in selected adjusted relative position. If the adjustment is such that the finger assembly is of substantially less width than the original slot 47 in the top of the carriage housing, then it is desirable to have small guide lugs 47a positioned at each end of the slot (FIG. 11) to cooperate with the upstanding finger as guide means. These may be attached in various ways such as by pressure-sensitive adhesive so as to stay in position. It is also possible to adjust the plates 76 vertically, as desired, by releasing the clamping plate 80 and moving the plates 76 to the proper vertical position and then tightening the clamping plates. In some instances it may be necessary to widen the slot 47 as well as shorten it as indicated in FIG. 11.

As previously indicated, for short articles, as the articles S in FIGS. 1, 6, 9 and 11, it is desirable to mount in the magazine, for example the magazine 32, an angle flange 38a in a vertically-disposed position on each of the wall units 36a and 36b behind the articles S. This angle preferably has a short flange 81 and a longer flange 82. Either or both of the flanges may carry on its outer surfaces a strip of magnetic or pressure-sensitive tape 83 so it may be adhered to the inner surface of the inner plate 63 in any desired position forwardly or rearwardly thereof depending on the length of the articles S as indicated. Thus, a pair of these flanges positioned on opposite wall units 36a and 36b will serve as intermediate stops in the magazines 33 to keep the articles S of the column located in a proper forward or rearward position as indicated best in FIG. 11.

For the very short articles S as in FIG. 11, it is necessary to modify the ejector so that it has a forwardly extending article contact finger 40b, as indicated in FIGS. 6, 10 and 11. The finger 40b has an article-contact portion 85 at its forward extremity. In this instance, the ejector arm 48 has the upstanding lug 40d which has been reduced both in width and length. An angle member 86 is provided, and its depending portion is provided with a vertical slot 87, through which the clamping screws 88 will pass and then on into openings 89 in the upstanding lug 40d. This permits vertical adjustment of the angle 86. Attached to the horizontal portion of the angle member 86 is the arm 89 which carries the contact portion 85 on its leading end. The arm 89 is connected to the angle member 86 by a screw and slot adjustment 91 which permits forward and rearward adjustment of the member 89. Thus, both vertical, and forward and rearward adjustment of the article contact portion 85 of the ejector finger unit 40b is possible. The forward and rearward adjustable elongated finger 40b compensates for the difference in length between the article S and the article P for which the machine was designed. In other words, contact of the ejector 40b will occur in the same point of movement of the carriage 45 as contact of the finger 40 with the article P. Therefore, the timing of the machine in its various operations is maintained the same whether the article is short or long. The vertical adjustment is desirable to compensate for some changes in thickness of the articles vended.

In FIGS. 14 and 15 there is illustrated another type of damper bar operating lug 51c shown, which is not only vertically adjustable, as is the lug 51b, but also has a forward and rearward adjustment to compensate for small differences in lengths in various articles being vended. In this case the finger is made of a resilient strip 95 of U-shape cross-section. It is clamped to the bar 51 by a screw 96 passing through a vertical slot 97 in the bar and cooperating with a pair of nuts 98 on the screw which will clamp the screw in the vertical position to which it is adjusted in the slot. The inner end of the screw 96 engages the inner leaf of the U-shaped spring 95 so that by threading the screw in and out of the nuts 98, the inner spring leaf can be adjusted in and out to, in effect, change the thickness of the member 95. Thus, there is an adjustment for changes in the length of the articles being vended as well as a vertical adjustment for changes in thickness.

In the previous description it has been disclosed how the side wall units 36a and 36b can be adjusted so that their inner walls 63 are vertical or upright and in parallel relationship. However, as indicated in FIG. 22, they can be adjusted so that they are angularly disposed and provide a tapered hopper for dispensing the cylindrical article C. Thick spacer bars 75 will be used between the lower ends of the inner wall 63 and the wall 62. This will bring the hinged lower ends of the walls 63 into converging relationship sufficiently so that only one cylindrical article C will feed down therebetween, where it will rest on the inner edges 100 of the flanges 66. Thus, the cylindrical article will rest on the flanges 66 properly for engagement by the selected ejector finger, for ejection. Ejection of the cylindrical article will occur exactly the same as in connection with the articles previously referred to.

In FIG. 22, there is illustrated a different type of cigarette machine having an ejector carriage 45a which is of different construction and operation. This carriage moves forward and rearward in a reciprocating manner the same as carriage 45. However, the ejector finger mechanism carried on the carriage instead of moving bodily vertically moves in a swinging motion. Thus the article-contacting finger unit 40e in this case is carried by an arm 48b. This arm is pivoted at 101 to a bracket 102 attached to the forward side of the housing 103 and within the housing. Vertical swinging movement of this member 48b is accomplished by means of a solenoid 46a which has a plunger 46b that engages the forward end of the housing when the solenoid is actuated. This will swing the ejector finger unit 40e upwardly into ejecting position as the carriage 45a moves forwardly in its ejecting stroke, as indicated by the broken lines in FIG. 22.

The ejector finger 40e, in this instance, is both vertically and laterally adjustable. It includes an upright fixed lug 40f (FIGS. 23 and 25) carried at the rear end of the member 48b. On this lug is vertically adjustably mounted a member 104 by means of a screw and slot connection 105. For horizontal adjustment to obtain variation in width, a pair of laterally movable overlapping U-shaped members 106 are provided which are connected to the member 104 and to each other by a screw and slot adjustment 107. Thus, the vertical position of the article-engaging unit 40e can be adjusted and its lateral extent can be varied in accordance with the size of the article to be ejected. This ejector mechanism will function the same as before, except that the article-engaging finger 40e will swing in a vertical path.

With reference to FIGS. 16 and 17, it will be apparent that the units 36a and 36b are exactly the same except that unit 36b has a forward flange 39a, whereas the unit 36a has no flanges. The flange 39a is formed integral with the forward edge of the outer plate 61. In some instances, it may be desirable to have a flange both at the forward and rearward edges of the wall unit to hold the articles in a vertical column. If so, the unit 36d illustrated in FIG. 19 should be used. In addition to the flange 39a, a rearward flange 38b will be provided and this will be formed integral with the outer wall 61.

In some certain instances, it may be desirable to have the side wall attachment unit without the lower support flanges 66. Such an arrangment is indicated at 36c in FIG. 18. This would be desirable where it is important to have variations for width of the articles, but there is no variation in thickness of the articles and, therefore, no need to change the plane of ejection.

It will be apparent from the above description that this invention provides means associated with the magazine for varying the plane of support and ejection of the lowermost article resting in the magazine in accordance with variations in thickness of articles to be vended, means associated with the magazine for changing its width in accordance with variations in the width of articles to be vended, means associated with the magazine for changing its forward to rearward extent in accordance with variations in the length of articles to be vended, and means for making any necessary variations in the article-engaging finger of the ejector to compensate for variations in the sizes of the articles being ejected.

Having thus described this invention, what is claimed is:

1. An article ejecting machine comprising ejector mechanism which includes a magazine having stop means adjacent its ejecting end for engaging and stopping the leading article of a supply of articles disposed in the magazine, said stop means engaging and stopping the leading article at a predetermined ejector plane, ejector means movable in an ejecting stroke to engage the leading article and move it off said stop means, and means for varying the plane of engagement of said stop means and leading article to change said ejector plane to adapt the mechanism to the ejection of articles of different thickness, said stop means comprising article-engaging stop means having a passage therebetween through which an article-engaging ejector finger can pass in its ejecting stroke, a carriage for supporting said finger and movable to produce the ejecting stroke of said finger, said means for varying the plane of engagement of said leading article comprising additional article-engaging stop members disposed inwardly of said first-named stop members to engage the leading article at an ejector plane spaced inwardly a distance corresponding to the difference in thickness.

2. An article ejecting machine according to claim 1 in which the first stop members are laterally spaced flanges at the ejector end of said magazine which extend inwardly toward each other but are laterally spaced apart to provide said passage through which the ejector finger can pass, said additional stop members comprising laterally spaced flanges overlapping said first flanges and which extend inwardly toward each other but are laterally spaced apart to provide a second passage cooperating with the first through which said ejector finger can pass.

3. An article ejecting machine comprising ejector mechanism which includes a magazine having supporting means adjacent its lower end for engaging and supporting the lowermost article of a column of articles disposed in the magazine, said supporting means supporting the lowermost article at a predetermined lever which is its ejector plane, ejector means movable in an ejecting stroke to engage the article and move it off said supporting means, and means for varying the level of support of said lowermost article to change said ejector plane to adapt the mechanism to the ejection of articles of different thicknesses, said supporting means comprising supporting members having a passage therebetween through which an article-engaging ejector finger can pass in its ejecting stroke, a carriage for supporting said finger and movable to produce the ejecting stroke of said finger, said means for varying the level of support of said lowermost article comprising additional supporting members disposed above said first-named supporting members to support the lowermost article at a higher level, said first supporting members being laterally spaced flanges at the lower end of said magazine which extend inwardly toward each other but are laterally spaced apart to provide Said passage through which the ejector finger can pass, said additional supporting members comprising laterally spaced support surfaces disposed above said first flanges to raise said ejector plane an amount substantially equal to the difference in thickness and which extend inwardly toward each other but are laterally spaced apart to provide a second passage over first through which said ejector finger can pass.

4. An article ejecting machine according to claim 3 in which said magazine has a discharge slot at its lower end, and a plate supported in dependent relationship to the slot to change its vertical extent so as to prevent ejection of the article next above the one being ejected.

5. An article ejecting machine according to claim 3 including an angle member on the inner surface of at least one of said side wall units in upright position with one of its flanges secured to said surface, and means for securing said flange to said wall surface at a selected distance intermediate the forward and rearward edges thereof to engage the adjacent ends of articles disposed between said side wall units.

6. An article ejecting machine according to claim 5 in which said angle member is secured in position by means which causes the angle member to adhere to the side wall unit.

7. An article ejecting machine according to claim 3 including a damper bar pivoted to the front side of the magazine at the lower end thereof and actuated by ejection of the lowermost article, and a lug extension on the bar positioned to be engaged by the adjacent end of said article.

8. An article ejecting machine according to claim 7 including means for connecting said lug extension to said bar for vertical movement to vary its extending position from the bar.

9. An article ejecting machine according to claim 8 in which said lug has means for varying its extent in the direction of movement of the ejected article.

10. An article ejecting machine according to claim 9 in which said means comprises a U-shaped spring and means for adjusting the spring to spread or contract it to, in effect, change the thickness of said lug.

11. An article ejecting machine according to claim 3 in which said ejector finger is mounted on a carriage for vertical movement into and out of article-contact position, means for moving the carriage in its ejecting stroke, said finger comprising a support having an upstanding article-contact portion.

12. An article ejecting machine according to claim 11 in which the article-contact portion therein. The laterally adjustably as to width on said support.

13. An article ejecting machine according to claim 11 in which the article-contact portion is adjustable as to length on said support.

14. An article ejecting machine according to claim 11 in which the article-contact portion is on the leading end of a horizontal member secured to said support.

15. An article ejecting machine according to claim 14 in which said horizontal member is attached to said support for both vertical and horizontal movement.

16. An article ejecting machine according to claim 15 in which the contact portion is laterally adjustable on said support as to width and is also vertically adjustable on said support.

17. An article ejecting machine according to claim 3 in which said magazine has side walls with the first article-supporting flanges adjacent the lower ends thereof, additional side wall units disposed and supported within the respective first side walls, said additional side wall units having additional article-supporting flanges formed respectively thereon and located above said first article-supporting flanges to provide said support surfaces for raising the ejector plane, and means for supporting said additional side wall units on the first side walls at variable vertical positions relative thereto to vary the level of said additional article supporting flanges.

18. An article ejecting machine according to claim 17 including securing means between the side walls of the magazine and the respective side wall units for securing them together.

19. An article ejecting machine according to claim 17 in which the side wall units are of selected thickness to adapt the magazine to the holding of articles of less width.

20. An article ejecting machine according to claim 19 in which each of the side wall units is expandable and collapsible to vary its thickness.

21. An article ejecting machine according to claim 20 in which each of the side wall units is formed of a plurality of panels vertically disposed in overlapping relationship and secured together at alternating ends to permit unfolding to receive spacers therebetween to expand the unit and hold it in expanded condition.

22. An article ejecting machine according to claim 21 including means disposed between the side wall of the magazine and the outer wall of the side wall unit for securing them together.

23. An article ejecting machine according to claim 20 in which at least one of said side wall units has an article engaging flange at one of its edges.

24. An article ejecting machine according to claim 23 in which said side wall unit has an article engaging flange at both its forward and rearward edges.

25. An article ejecting machine have a magazine for supporting a series of articles in sequential relationship for feeding toward an ejecting end, and having laterally spaced side walls, means for ejecting an article from the ejecting end of the magazine, and means for adapting the magazine to articles of different widths, said last-named means comprising at least one additional side wall unit supported within one of the magazine side walls, said side wall unit being of an adjustable thickness to adapt the magazine to the holding of articles of less width, said side wall unit consisting of at least two panels hinged together at one end, and expanding means fitting between the panels to angularly adjust them relatively about the hinge, and means for securing the inner of the panels to the adjacent side wall.

26. An article ejecting machine according to claim 25 in which each of the side wall units is formed of more than two panels disposed in overlapping relationship along the side wall and hinged together at alternating ends to permit unfolding to receive said expanding means in the form of spacers therebetween to expand the unit and hold it in expanded condition.

27. An article ejecting machine have a magazine for supporting a column of superimposed articles, and having laterally spaced side walls, means for ejecting an article from the lower end of the magazine, and means for adapting the magazine to articles of different widths, said last-named means comprising at least one additional side wall unit supported within one of the magazine side walls, said side wall unit being of an adjustable thickness to adapt the magazine to the holding of articles of less width, said side wall unit consisting of at least two panels hinged together at one end, and expanding means fitting between the panels to angularly adjust them relatively about the hinge, and means for securing the inner of the panels to the adjacent side wall.

28. An article ejecting machine according to claim 27 including an angle member secured to the inner surfaces of at leAst one of said side wall units in upright position at a selected distance intermediate the forward and rearward edges thereof to engage the adjacent ends of articles disposed between said side wall units.

29. An article ejecting machine according to claim 27 in which each of the side wall units is formed of more than two panels vertically disposed in overlapping relationship and hinged together at alternating ends to permit unfolding to receive said expanding means in the form of spacers therebetween to expand the unit and hold it in expanded condition.

30. An article ejecting machine according to claim 29 including means disposed between the side wall of the magazine and the outer wall of the side wall for securing them together.

31. An article ejecting machine according to claim 27 in which at least one of said side wall units has an article engaging flange at one of its edges.

32. An article ejecting machine according to claim 31 in which said side wall unit has an article engaging flange at both its forward and rearward edges.

33. An article ejecting machine comprising ejector mechanism which includes a magazine having stop means adjacent its ejecting end for engaging and stopping the leading article of a supply of articles disposed in the magazine, said stop means engaging and stopping the leading article at a predetermined ejector plane, ejector means movable in an ejecting stroke to engage the leading article and move it off said stop means, said stop means comprising laterally spaced inwardly extending flanges at the ejecting end of the magazine having a passage therebetween through which an article-engaging ejector finger can pass in its ejecting stroke, a carriage for supporting said finger and movable to produce the ejecting stroke of said finger, and U-shaped clamp portions engaging said flanges and adjustable longitudinally and laterally thereon.

34. An article engaging machine according to claim 33 in which a pair of U-shaped clamp portions is engaged with each of said flanges for relative lateral and longitudinal adjustment.

35. An article ejecting machine comprising ejector mechanism which includes a magazine having supporting means adjacent its lower end for engaging and supporting the lowermost article of a column of articles disposed in the magazine, said supporting means supporting the lowermost article at a predetermined level which is its ejector plane, ejector means movable in an ejecting stroke to engage the article and move it off said supporting means, and means for varying the lever of support of said lowermost article to change said ejector plane to adapt the mechanism to the ejection of articles of different thicknesses, said supporting means comprising supporting members having a passage therebetween through which an article-engaging ejector finger can pass in its ejecting Stroke, a carriage for supporting said finger and movable to produce the ejecting stroke of said finger, said means for varying the level of support of said lowermost article comprising additional supporting members disposed above said first-named supporting members to support and lowermost article at a higher level, said first supporting members being laterally spaced flanges at the lower end of said magazine which extend inwardly toward each other but are laterally spaced apart to provide said passage through which the ejector finger can pass, said additional supporting members comprising laterally spaced flanges overlapping said first flanges and which extend inwardly toward each other but are laterally spaced apart to provide a second passage over the first through which said ejector finger can pass, said laterally spaced flanges of the additional supporting members being in the form of flange units comprising a fixed portion and a U-shaped clamp portion engaging the fixed portion but adjustable longitudinally and laterally thereon.

36. An article ejecting machine according to claim 35 in which a pair of U-shaped clamp portions is engaged with the fixed portion for relative lateral and longitudinal adjustment.

37. An article ejecting machine comprising ejector mechanism which includes a magazine having supporting means adjacent its lower end for engaging and supporting the lowermost article of a column of articles disposed in the magazine, said supporting means supporting the lowermost article at a predetermined level which is its ejector plane, ejector means movable in an ejecting stroke to engage the article and move it off said supporting means, and means for varying the level of support of said lowermost article tO change said ejector plane to adapt the mechanism to the ejection of articles of different thicknesses, said supporting means comprising supporting members having a passage therebetween through which an article-engaging ejector finger can pass in its ejecting stroke, a carriage for supporting said finger and movable to produce the ejecting stroke of said finger, said means for varying the level of support of said lowermost article comprising additional supporting members disposed above said first-named supporting members to support the lowermost article at a higher level, said first suppOrting members being laterally spaced flanges at the lower end of said magazine which extend inwardly toward each other but are laterally spaced apart to provide said passage through which the ejector finger can pass, said additional supporting members comprising U-shaped clamp portions engaging said flanges and adjustable longitudinally and laterally thereon.

38. An article ejecting machine according to claim 37 in which a pair of U-shaped clamp portions is engaged with each of said flanges for relative lateral and longitudinal adjustment.

39. An article electing machine comprising ejector mechanism which includes a magazine having supporting means adjacent its lower end for engaging and supporting the lowermost article of a column of articles disposed in the magazine, said supporting means supporting the lowermost article at a predetermined level which is its ejector plane, ejector means movable in an ejecting stroke to engage the article and move it off said supportIng means, and means for varying the level of support of said lowermost article to change said ejector plane to adapt the mechanism to the ejection of articles of different thicknesses, said supporting means comprising supporting members having a passage therebetween through which an article-engaging ejector finger, can pass in its ejecting stroke, a carriage for supporting said finger and movable to produce the ejecting stroke of said finger, said means for varying the level of support of said lowermost article comprising additional supporting members disposed above said first-named supporting members to support the lowermost article at a higher level, said first supporting members being laterally spaced flanges at the lower end of said magazine which extend inwardly toward each other but are laterally spaced apart to provide said passage through which the ejector finger can pass, said additional supporting member comprising laterally spaced flanges overlapping said first flanges and which extend inwardly toward each other but are laterally spaced apart to provide a second passage over the first through which said ejector finger can pass, said magazine having side walls with the first article-supporting flanges adjacent the lower ends thereof, additional side wall units disposed and supported within the respective first side walls, said additional side wall units having said additional article-supporting flanges formed respectively thereon and located above said first article-supporting flanges, and means for supporting said additional side wall units on the first side walls at variable vertical positions relative thereto to vary the level of said additional article supporting flanges, said flanges on the side wall units being on the lower ends thereof and comprising a fixed portion and a U-shaped clamp portion engaging the fixed portion but adjustable longitudinally and laterally thereon.

* * * * *